July 8, 1941.    H. GORDON ET AL    2,248,528
TAPPET OPERATING ARRANGEMENT FOR INTERNAL COMBUSTION ENGINES
Filed April 30, 1938    3 Sheets-Sheet 1

INVENTORS
H. Gordon + S. H. Atwood
BY
E. F. Wendroth
ATTORNEY

July 8, 1941.   H. GORDON ET AL   2,248,528
TAPPET OPERATING ARRANGEMENT FOR INTERNAL COMBUSTION ENGINES
Filed April 30, 1938   3 Sheets-Sheet 2

INVENTORS
H. Gordon + S. H. Attwood
BY
E. F. Wuesteroth
ATTORNEY

July 8, 1941.    H. GORDON ET AL    2,248,528
TAPPET OPERATING ARRANGEMENT FOR INTERNAL COMBUSTION ENGINES
Filed April 30, 1938    3 Sheets-Sheet 3

H. Gordon + S. H. Attwood INVENTOR
BY
C. F. Wendroth
ATTORNEY

Patented July 8, 1941

2,248,528

UNITED STATES PATENT OFFICE 2,248,528

TAPPET OPERATING ARRANGEMENT FOR INTERNAL COMBUSTION ENGINES

Hamilton Gordon, Weyburn, Elstead, and Stanley Herbert Attwood, New Malden, England, assignors to Attwood Diesel Equipment Company Limited, London, England, a British company Application April 30, 1938, Serial No. 205,338 In Great Britain May 1, 1937

18 Claims. (Cl. 123—90)

This invention relates to tappet operating arrangements for use in injection systems of internal combustion engines and more particularly to distributors for liquid fuel injection systems for internal combustion engines.

The chief object of the present invention is to provide an improved tappet operating arrangement for use in injection systems of internal combustion engines.

A more particular object of the present invention is to provide a tappet operating arrangement for a distributor for liquid fuel injection systems for internal combustion engines whereby the distributor affords extremely accurate regulation of the control operations both as regards timing of the commencement of the injection in relation to the engine cycle and as regards the period of opening of the injector valves in relation to angular displacement of the engine crankshaft and which enables the hydraulic control of the fuel injectors of an internal combustion engine to be operated with great precision. A further object of the present invention is to provide a distributor of the above character which is light in its control operation, of a compact design and in which wear of the operative parts is reduced to a minimum and hence a long working life is assured.

With the above object in view the present invention consists in a tappet operating arrangement for use in an injection system of an internal combustion engine comprising tappet means and at least one pair of cams for actuating said tappet means solely by the joint action of both cams of each pair on said tappet means, said tappet means being rotatable relatively to said cams and said cams being displaceable relatively to one another and/or together with respect to the tappet means for the purpose respectively of regulating the period of operation and/or the timing of operation.

More specifically stated the present invention consists in a tappet operating arrangement for use in an injection system of an internal combustion engine comprising tappet means and at least one pair of cams for actuating said tappet means by the joint action of both cams of each pair on said tappet means, said cams being displaceable relatively to one another and/or together with respect to the axis of a driving shaft which is arranged to rotate the tappet means relatively to the cams.

In one constructional form of tappet operating arrangement according to the present invention as embodied in a distributor for liquid fuel the tappet means is rotatable relatively to the cams and a pair of cams of fixed locus are provided for operating each control valve of the distributor, the relative disposition of the cams of each pair being identical in the different pairs and with respect to the associated control valve so that as the tappet means passes over the successive pairs of cams, all the control valves will be operated in succession at the same point in time in relation to the cycle of operation of the respective engine cylinders and will effect the opening of all the injector valves for the same period of time in relation to engine crank angle displacement. The cams of each pair are made to overlap in their actuation of the tappet means so that by adjusting one cam in its position with respect to the other the period of actuation of the control valve and therefore the period of opening of the corresponding injector valve will be variable. For the purpose of advancing and retarding the actuation of the control valves and therefore the timing of the injector valves, the pairs of cams are made movable in unison forwardly and backwardly along the path of rotational movement of the tappet means.

In order that the present invention may be more clearly understood and readily carried into effect reference may now be made to the accompanying drawings illustrating distributors embodying tappet operating arrangements according to the present invention suitable for use in connection with a four cylinder compression ignition internal combustion engine having a fuel injection system operating in the manner described in our co-pending patent application No. 205,339.

In the accompanying drawings.

Figure 1:
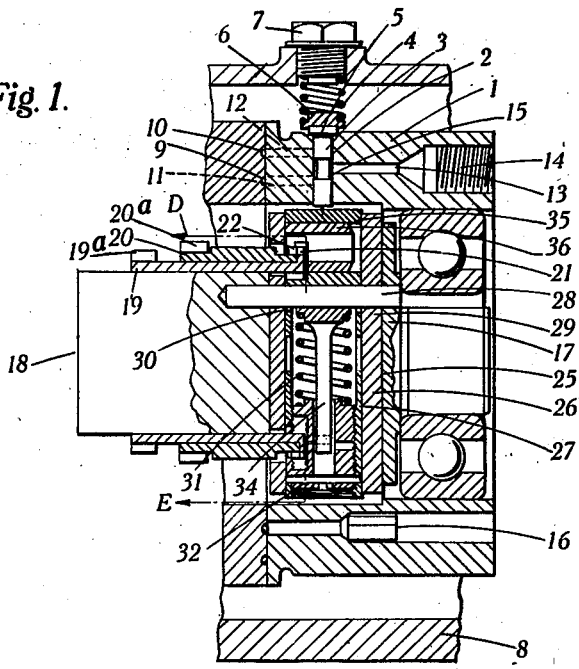
Fig. 1 is a cross sectional view of one embodiment of a distributor embodying a tappet operating arrangement according to the present invention on the line ABC of Fig. 2.
Figure 2:
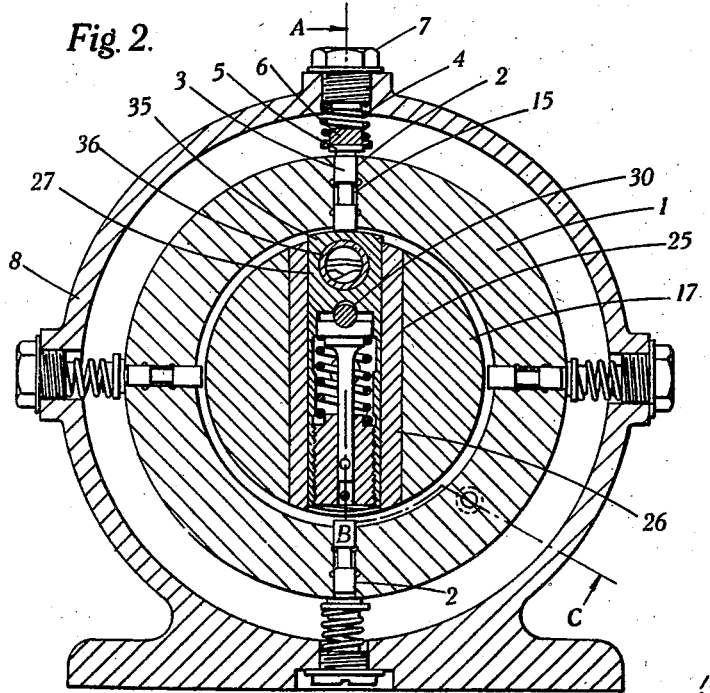
Fig. 2 is a true cross sectional view of the distributor through the axes of the control valves.

Referring first to Figs. 1–7 of the drawings, the distributor comprises an annular body portion 1 the front face of which (on the right in Figure 1) has a cover plate (not shown) applied thereto while the rear face is adapted to have a supporting body applied thereto. Four equally spaced cylindrical holes 2 are formed radially through the annular body portion 1, and a control valve 3 is provided in each hole 2 and is normally pressed by a spring 4 into an innermost position in which a collar 5 on the outer end of the valve 3 bears against the body portion 1; a washer 6 seats upon the collar 5 and the spring 4 bears at one end on the washer 6 and at its other end on a cap 7 screwed into or otherwise secured to the distributor casing 8. In the rear face of the supporting body two grooves 9 and 10 are formed from which channels 11, 12 drilled into the body portion 1 extend to each of the cylindrical holes 2 whilst on the opposite side of body portion 1 a third channel 13 communicates with each cylindrical hole 2 at a position between the other two channels 11, 12, the third channel 13 being in communication with a screw-threaded recess 14 in the front of the body portion 1 into which a nipple may be screwed for the purpose of connecting the third channel to a pipe for delivering fuel to an injector. Each control valve 3 is provided with an annular recess 15 which in the normal innermost position of the control valve establishes communication between the channel 11 from the innermost groove 9 and the third channel 13 located on the other side of the valve whilst in a raised or operative position of the valve the channel 12 from the outermost groove 10 is arranged in communication through the piston recess 15 with the third channel 13. The grooves 9 and 10 are adapted to communicate respectively with a relief valve 16 which maintains fuel at a predetermined residual pressure for example of 50 lbs. per square inch or even more and with the output side of a high pressure pump.

Figure 3:
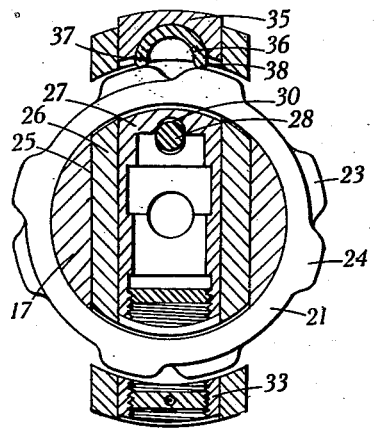
Fig. 3 is a cross sectional view on the line D—E of Fig. 1 but drawn to a larger scale than Fig. 1.
Figure 4:
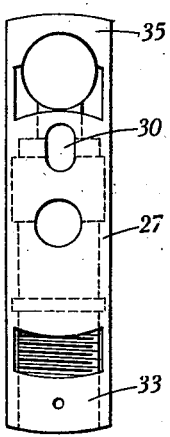
Figs. 4 and 5 are elevational views of the control valve tappet and tappet bush respectively to the same scale as Fig. 3.
Figure 5:
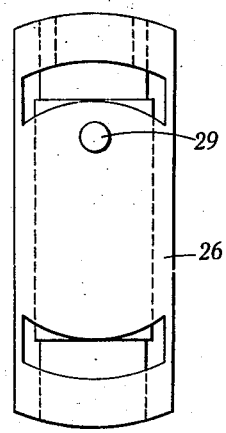
Figure 6:
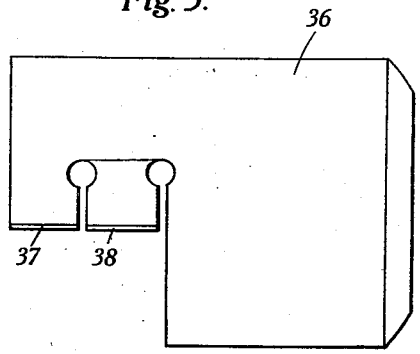
Figs. 6 and 7 are elevational and sectional plan views respectively of the tappet rocker but drawn to a larger scale than Fig. 3.
Figure 7:
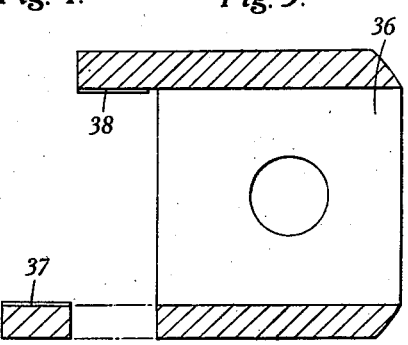

Disposed coaxially within the annular body portion 1 is the enlarged end 17 of a driving shaft 18 adapted to be driven at a suitable speed and upon which relatively rotatable sleeves 19, 20, concentrically arranged with respect to one another and to the shaft are mounted. The inner sleeve 19 abuts at one end against the outer face of the enlarged end 17 of the shaft 18 and extends at its other end slightly beyond the corresponding end of the outer sleeve 20. Cam rings 21, 22 are attached to or formed on the corresponding ends of the sleeves 19, 20, and each cam ring 21, 22 is provided with four projecting cam surfaces 23, 24 as shown in Fig. 3, the cams being associated in pairs one from each ring and each pair being located in the immediate vicinity of one of the control valves 3.

The cams 23, 24 have peaks which are concentric with the axis of the sleeves 19, 20. The other ends of the sleeves 19, 20 located outside the body portion 1 and inside the supporting body each have a toothed segment 19a, 20a, provided thereon for purposes hereinafter described.

The driving shaft 18 extends through the innermost sleeve 19 and at a position in line with a control valve 3, the enlarged end 17 thereof is provided with a diametrical hole 25 through which extends a tappet bush 26. A hollow cylindrical tappet 27 is disposed within the bush 26 and an abutment 28 extends through circular holes 29 in the bush 26 and slots 30 in the tappet 27 and is firmly secured in the shaft 18 and its enlarged end 17. The slots 30 extend axially of the tappet 27 to permit axial movement of the tappet for actuation of the control valves 3 as will be hereinafter described, and a compression spring 31 reacts between the fixed abutment 28 and a plug 32 screwed into the end 33 of the tappet 27. A strut 34 for the spring extends axially thereof and bears at one end against the abutment and slides at its other end in the plug 32. At the end 35 of the tappet 27 opposite to that which receives the plug 32 the tappet 27 is formed to receive a substantially cylindrical tappet rocker 36 mounted so as to be capable of rotational movement about the longitudinal axis of the rocker and having surfaces 37, 38 for co-operation with the cams 23, 24. The surfaces 37, 38, which may be regarded as rocker arm followers, extend over a predetermined arc in relation to the periphery of the cam rings 21, 22 and are mutually offset in the axial direction of the driving shaft so that one surface or arm 37 co-operates with the cams 23 of one ring 22 and the other surface or arm 38 co-operates with the cams 24 of the other ring 21. The arrangement is such that when the tappet 27 is not actuated by any cam, a slight clearance is provided between the end 35 of the tappet and the inner ends of the control valves 3.

If one arm only of the rocker 36 is actuated by a cam the rocker 36 will be rocked or rotated idly without displacing the tappet whereas if both arms of the rocker 36 are actuated jointly by cams the rocker 36 and tappet 27 therewith will be displaced radially to move a control valve to an extent which places the channel 12 from the outer annular groove 10 in communication with the third channel 13 hereinbefore mentioned. For a minimum period of actuation of a control valve (corresponding to a minimum period of opening of an injector valve in relation to engine crank angle displacement) the cams of each pair will be so positioned relatively to one another that as the tappet 27 is rotated first one surface or arm of the rocker 36 rides on to its cam and reaches a position closely approaching the end of the said cam before the other surface or arm of the rocker 36 rides on to its corresponding cam so that after a short further movement from the point where the latter surface or arm is lifted by its cam and the control valve 3 therefore actuated, the first mentioned surface or arm of the rocker 36 will ride off its cam and the control valve will be returned to its normal or innermost position. It will be appreciated that although the different pairs of cams each have a fixed locus in relation to the associated control valve, by moving the cam sleeves 19, 20 rotationally in one direction or the other the timing of the actuation of the control valve may be advanced or retarded whilst if one of the sleeves is moved so as to displace the cams thereon with respect to the cams on the other sleeve the period of actuation of a control valve (and therefore the period of opening of an injector valve) may be regulated and preferably this regulation of period is effected by displacing the cams which come first into operation on the tappet in a valve actuating cycle.

From the foregoing description it will be clear that by rotation of the driving shaft 18, the tappet 27 will be carried successively over the different pairs of cams to actuate the control valves successively so that if the shaft 18 is driven in synchronism with the engine crankshaft (that is to say at half the engine crankshaft speed for a four-stroke cycle engine and at engine speed for a two-stroke cycle engine) the control valves and therefore the injector valves will be operated to effect the correct injection of fuel to the engine cylinders.

With the construction of tappet as described above the tappet may be easily centrifugally balanced. A further advantage of the tappet arrangement described lies in the fact that in view of the curved projection on the double armed rocker no lateral forces are applied to the control valves in operating them and thus all wear of the valves which would result through such lateral forces is avoided.

Figure 8:
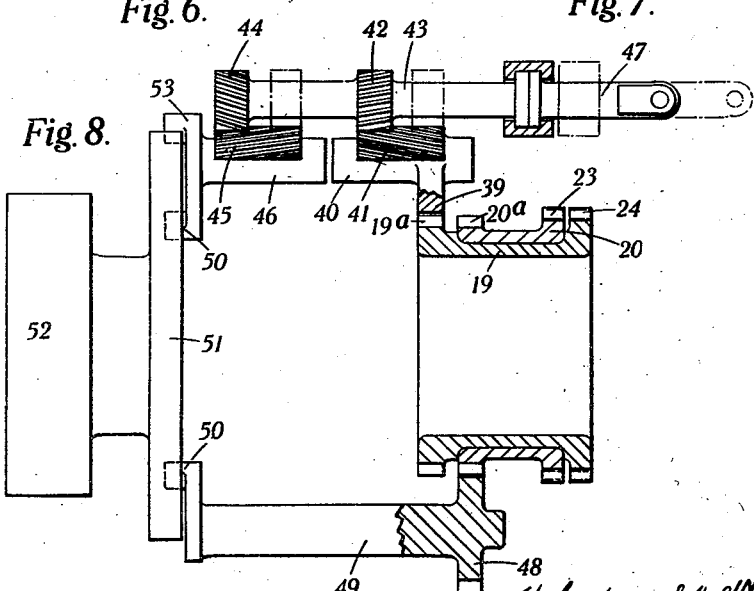
Fig. 8 is a diagrammatic view of certain parts of the distributor for the purpose of illustrating the manner in which the time and period of injection is controlled.

The "timing" and "period" control of the cams may be effected in any desired manner and in Fig. 8 one form which such control may take is illustrated diagrammatically. As shown in this figure the toothed segment 19a hereinbefore mentioned on the sleeve 19 of the period cam ring, in this case the innermost ring, is provided with teeth which mesh with similar teeth on a sector 39 secured to one portion 40 of a control spindle provided with a helically toothed portion 41 with which a pinion 42 mounted upon a shaft 43 meshes. The shaft 43 also carries a pinion 44 which meshes with a helically toothed portion 45 on another portion 46 of the control spindle. The shaft 43 is operatively connected to a rod 47 which is adapted to be coupled with a period control pedal or lever (not shown) by which the driver or operator of the engine can control the period of injection and therefore the power of the engine, movement of this lever or pedal causing axial displacement of the helical toothed pinions 42 and 44 which results in a corresponding rotational movement in one direction or the other of the sleeve 19 carrying the period cams. The coupling of the rod 47 to the spindle 43 is such as to permit rotation of the spindle relatively to the rod and therefore to the connection between the rod and the operator's pedal or lever. Rotation of the spindle 43 is normally prevented when the spindle is axially displaced, by the locking of the teeth of the pinion 44 in those of the relatively fixed segment 45 so as to ensure that such axial displacement will produce rotational movement of the spindle 40 by virtue of the sliding of the helical teeth of the pinion 42 over those of the segment 41.

The toothed segment 20a of the other sleeve 20 is arranged in mesh with a pinion 48 secured to a spindle 49 which is rotatably mounted in the supporting body of the distributor. The two spindles 46 and 49 are adapted to be rotated in unison in any suitable manner so that the cam sleeves 19, 20 can be rotated together through a certain range of movement optionally in one direction or the other and thereby move the two cam rings in unison, thus enabling the timing of the actuation of the control valves, and therefore of the injection, to be varied as may be desired. For example, the two spindles 46 and 49 may each be provided with a crank pin 50 arranged to co-act with cam forms (not shown) of a master cam plate 51 such as that described in our co-pending application No. 205,337 the arrangement being such that upon rotation of the master cam plate both the spindles will be rotated in unison to effect the advance or retardation of the timing of injection. With the latter arrangement the timing may be readily automatically controlled by connecting the master cam plate 51 to a speed governor 52 in the manner described in our copending application No. 205,337.

The anchoring of the pin 50 in a cam slot in the plate 51 ensures the relatively fixed condition of the segment 45 above referred to during operation of the "period" control by axial displacement of the rod 47.

It will be appreciated that with the described arrangement, particularly when the movement of the spindles 46 and 49 for timing purposes is controlled by cam forms, the period of injection can be altered manually if desired under all conditions without alteration in the timing and, further, that where a master cam plate is used the advance or retardation in the timing may be given any desired characteristic in relation to speed by suitably forming the cam forms in the master cam plate 51. The employment of a speed governor controlled master cam plate also lends itself in a particularly advantageous manner to the provision of a control which automatically stops injection or materially reduces the quantity of fuel injected when a predetermined limiting engine speed is reached. This may be effected by providing a suitable contour to the cam in the master cam plate 51 which controls the spindle 46 in such a manner that the crank pin 50 of the spindle 46 can be rapidly displaced by the action of a supplementary cam projection (not shown) of the master cam plate 51 on another crank pin 53 provided on the same spindle 46 to rotate the spindle in a direction in which the period of actuation of the control valve and therefore of the injection is reduced or cut out within a few degrees of movement of the master cam plate. Such an arrangement is described also in our co-pending application No. 205,337.

Although the distributor has been described above for use in an injection system in which the liquid distributed to the injectors is the fuel to be injected, it is to be understood that the distributor may be suitably constructed and arranged for operation with an injection system in which the distributor hydraulically controls the opening and closing of the injector valves and the fuel injected is supplied independently from a high pressure source.

Figure 9:
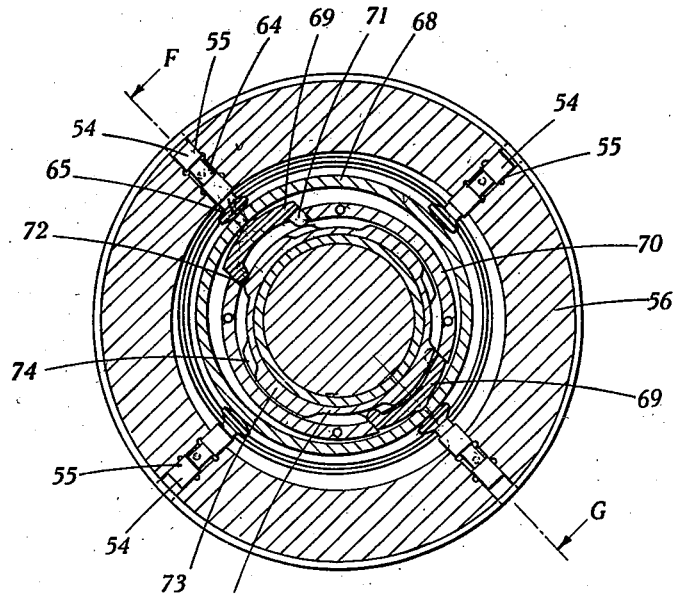
Fig. 9 is a cross sectional view of a modified form of distributor embodying a tappet operating arrangement according to the present invention with casing omitted.
Figure 10:
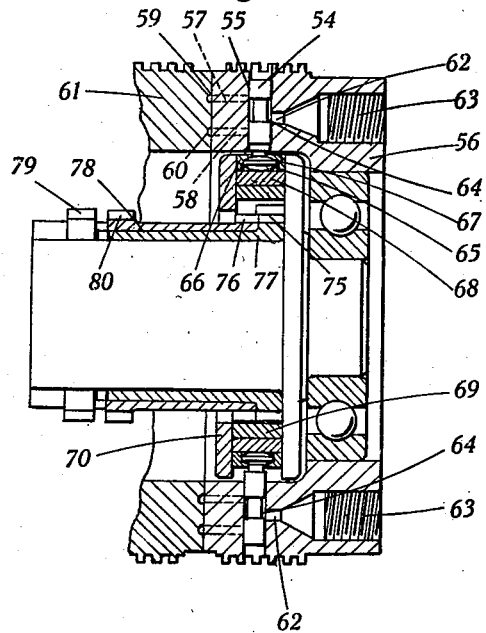
Fig. 10 is a cross sectional view on the line F—G of Fig. 9.

The distributor above described may be modified so as to give a positive return movement to the control valve 54 instead of a spring return movement and one such modified form of distributor is illustrated in Figs. 9 and 10. In these figures the control valves 54 are arranged in radial disposed cylindrical holes 55 in the distributor body portion 56, the holes 55 communicating by way of channels 57, 58, with grooves 59, 60 in a supporting body 61 which communicate with the output side of a high pressure pump and with a relief valve respectively. A channel 62 communicates with each hole 55 at a position between the channels 57, 58, and is in communication with a screw-threaded recess 63 into which a nipple may be screwed for the purpose of connecting the channel 62 to a pipe for delivering fuel to an injector. Each control valve 54 is provided with a recessed portion 64 for the purpose described in connection with the form of distributor shown in Figs. 1–8, and with an enlarged head 65 at its innermost end, the several heads 65 having an accurate working fit in between the rings 66 and 67 and the floating ring 68 to which an eccentric movement is imparted by a pair of rockers 69 pivotally carried at diametrically opposite positions by a cylindrical member 70 secured to or forming part of a driving shaft. The rockers 69 are mounted in the member 70 so as to be capable of limited radial, as well as pivotal, movement with respect to the member 70, and have surfaces or arms 71, 72, offset with respect to one another axially of the distributor for co-operation with cams 73, 74 on cam rings 75, 76 carried by sleeves 77, 78.

The cams 73, 74 co-operate with the rocker surfaces or arms 71, 72 to cause radial movement of the rockers 69 in a similar manner to that in which the cams 23, 24 co-operate with the tappet surfaces 37, 38 to effect movement of the tappet 27 in the arrangement described in Figs. 1–8, and the various parts are so arranged relatively to one another that the ring 68 has an eccentric movement imparted to it, which effects successive operation of the control valves 54. The "timing" and "period" control in the case of this modification of the invention may be the same as that described in connection with the distributor described with reference to Figs. 1–7, and for this purpose the sleeves 77, 78 may be provided with toothed segments 79, 80 similar to the toothed segments 19a, 20a.

A portion of the liquid flowing through the distributor is preferably discharged into the interior thereof to lubricate the various parts thereof.

The distributor may be combined with a high pressure feed pump for supplying liquid fuel at injection pressure and with any other units of the injection system such as have already been indicated above or it may be constructed as an independent unit.

The distributor may be designed for supplying liquid fuel to an engine with any number of cylinders and in the case of engines having a large number of cylinders, for example, upwards of eight, more than one set of cam rings may be required.

What we claim is:

1. A tappet operating arrangement for use in an injection system of an internal combustion engine comprising tappet means and at least one pair of cams for actuating said tappet means solely by the joint action of both cams of each pair on the tappet means, said tappet means being rotatable relatively to said cams and said cams being displaceable relatively to one another with respect to said tappet means for the purpose of regulating the period of operation.

2. A tappet operating arrangement for use in an injection system of an internal combustion engine comprising tappet means and at least one pair of cams for actuating said tappet means solely by the joint action of both cams of each pair on the tappet means, said tappet means being rotatable relatively to said cams and said cams being displaceable together with respect to said tappet means for the purpose of regulating the timing of operation.

3. A tappet operating arrangement for use in an injection system of an internal combustion engine comprising tappet means and at least one pair of cams for actuating said tappet means solely by the joint action of both cams of each pair on the tappet means, said tappet means being rotatable relatively to said cams and said cams being displaceable relatively to one another and together with respect to said tappet means for the purpose respectively of regulating the period of operation and the timing of operation.

4. A tappet operating arrangement for use in an injection system of an internal combustion engine comprising tappet means, at least one pair of cams for actuating said tappet means solely by the joint action of both cams of each pair on the tappet means, a driving shaft for rotating said tappet means relatively to said cams, said cams being displaceable relatively to one another with respect to said driving shaft.

5. A tappet operating arrangement for use in an injection system of an internal combustion engine comprising tappet means, at least one pair of cams for actuating said tappet means solely by the joint action of both cams of each pair on the tappet means, a driving shaft for rotating said tappet means relatively to said cams, said cams being displaceable together with respect to said driving shaft.

6. A tappet operating arrangement for use in an injection system of an internal combustion engine comprising tappet means, at least one pair of cams for actuating said tappet means solely by the joint action of both cams of each pair on the tappet means, a driving shaft for rotating said tappet means relatively to said cams, said cams being displaceable relatively to one another and also together with respect to said driving shaft.

7. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said rocker solely by the joint action of both cams of each pair on said rocker to move said tappet relatively to said shaft, and spring means for returning said tappet to normal position after operation by said cams, said cams being displaceable relatively to one another with respect to said shaft for the purpose of regulating the period of operation.

8. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said rocker solely by the joint action of both cams of each pair on said rocker to move said tappet relatively to said shaft, and spring means for returning said tappet to normal position after operation by said cams, said cams being displaceable together with respect to said shaft for the purpose of regulating the timing of operation.

9. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said rocker solely by the joint action of both cams of each pair on said rocker to move said tappet relatively to said shaft and spring means for returning said tappet to normal position after operation by said cams, said cams being displaceable relatively to one another and together with respect to said shaft for the purpose respectively of regulating the period of operation and the timing of operation.

10. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said tappet through said rocker solely by the joint action of both cams of each pair on said rocker upon rotation of said shaft, said cams being displaceable relatively to one another with respect to said driving shaft.

11. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said tappet through said rocker solely by the joint action of both cams of each pair on said rocker upon rotation of said shaft, said cams being displaceable together with respect to said driving shaft.

12. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said rocker solely by the joint action of both cams of each pair on said rocker to move said tappet relatively to said shaft, spring means for returning said tappet to normal position after operation by said cams, said cams being displaceable relatively to one another and together with respect to said shaft for the purpose respectively of regulating the period of operation and the timing of operation, said tappet rocker being of cylindrical form and rotatably mounted about its axis lying transverse to the plane of rotation of the tappet, and having axially displaced surfaces for cooperation with the respective operating cams.

13. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said tappet through said rocker solely by the joint action of both cams of each pair on said rocker upon rotation of said shaft, said cams being displaceable relatively to one another with respect to said driving shaft, said tappet rocker being of cylindrical form and rotatably mounted about its axis lying transverse to the plane of rotation of the tappet, and having axially displaced surfaces for cooperation with the respective operating cams.

14. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said tappet through said rocker solely by the joint action of both cams of each pair on said rocker upon rotation of said shaft, said cams being displaceable together with respect to said driving shaft, said tappet rocker being of cylindrical form and rotatably mounted about its axis lying transverse to the plane of rotation of the tappet, and having axially displaced surfaces for cooperation with the respective operating cams.

15. A tappet operating arrangement for use in an injection system of an internal combustion engine comprising a rotatable driving shaft, a tappet movably mounted upon and rotated by said shaft, a tappet rocker carried by said tappet, at least one pair of cams for actuating said tappet through said rocker solely by the joint action of both cams of each pair on said rocker upon rotation of said shaft, said cams being displaceable relatively to one another and together with respect to said driving shaft, said tappet rocker being of cylindrical form and rotatably mounted about its axis lying transverse to the plane of rotation of the tappet, and having axially displaced surfaces for cooperation with the respective operating cams.

16. A tappet operating arrangement for use in an injection system of an internal combustion engine comprising a floating member, a rotatable driving shaft, a pair of oppositely disposed rockers carried by and rotatable with said driving shaft, arms on said rockers and at least one pair of cams for actuating said rockers by the joint action of each pair of cams on said arms to cause said rockers to move said floating member positively in successive opposite directions, said cams being displaceable relatively to one another with respect to said driving shaft for the purpose of regulating the period of operation.

17. A tappet operating arrangement for use in an injection system of an internal combustion engine comprising a floating member, a rotatable driving shaft, a pair of oppositely disposed rockers carried by and rotatable with said driving shaft, arms on said rockers, and at least one pair of cams for actuating said rockers by the joint action of each pair of cams on said arms to cause said rockers to move said floating member and thereby successively operate said member positively in successive opposite directions, said cams being displaceable together with respect to said driving shaft for the purpose of regulating the timing of the operation.

18. A tappet operating arrangement for use in an injection system of an internal combustion engine comprising a floating member, a rotatable driving shaft, a pair of oppositely disposed rockers carried by and rotatable with said driving shaft, arms on said rockers, and at least one pair of cams for actuating said rockers by the joint action of each pair of cams on said arms to cause said rockers to move said floating member positively in successive opposite directions, said cams being displaceable relatively to one another and together with respect to the driving shaft for the purpose respectively of regulating the period of operation and the timing of operation.

HAMILTON GORDON.
STANLEY HERBERT ATTWOOD.